United States Patent [19]

Horch et al.

[11] Patent Number: 4,718,700
[45] Date of Patent: Jan. 12, 1988

[54] T-SHAPED HOSE

[75] Inventors: Frank Horch, Buxtehude; Hermann Brockmann, Buchholz; Herbert Barfuss; Werner Schütt, both of Hamburg, all of Fed. Rep. of Germany

[73] Assignee: Phoenix Aktiengesellschaft, Hamburg-Harburg, Fed. Rep. of Germany

[21] Appl. No.: 752,146

[22] Filed: Jul. 3, 1985

[30] Foreign Application Priority Data

Aug. 16, 1984 [DE] Fed. Rep. of Germany ....... 3430053

[51] Int. Cl.$^4$ ............................................. F16L 41/00
[52] U.S. Cl. .................................... 285/156; 285/189; 285/423; 285/915
[58] Field of Search ............... 285/156, 189, 284, 292, 285/197, 423, 915

[56] References Cited

U.S. PATENT DOCUMENTS 3,406,988 10/1968 Jones ............................ 285/156 X
4,613,168 9/1986 Smith et al. ..................... 285/156 X
4,650,220 3/1987 Grabowski ..................... 285/156 X

FOREIGN PATENT DOCUMENTS 2502736 10/1982 France ............................ 285/197
2518699 6/1983 France ............................ 285/197

Primary Examiner—Thomas F. Callaghan
Attorney, Agent, or Firm—Collard, Roe & Galgano

[57] ABSTRACT

A T-shaped hose includes a vulcanized main hose having a wall with an opening therein and a vulcanized branch hose having one end disposed adjacent to the opening in the main hose, so that the hoses are approximately in the form of a "T". A hollow generally cylindrical branch sleeve having a generally outwardly directed flange at its lower end and an annular recess formed in the outer wall of the sleeve adjacent to the flange, is disposed primarily within the branch hose with the flange engaging the inner wall of the main hose and defining therebetween an annular channel. A fixation member composed of a vulcanizable rubber is received with the recess and channel.

2 Claims, 4 Drawing Figures

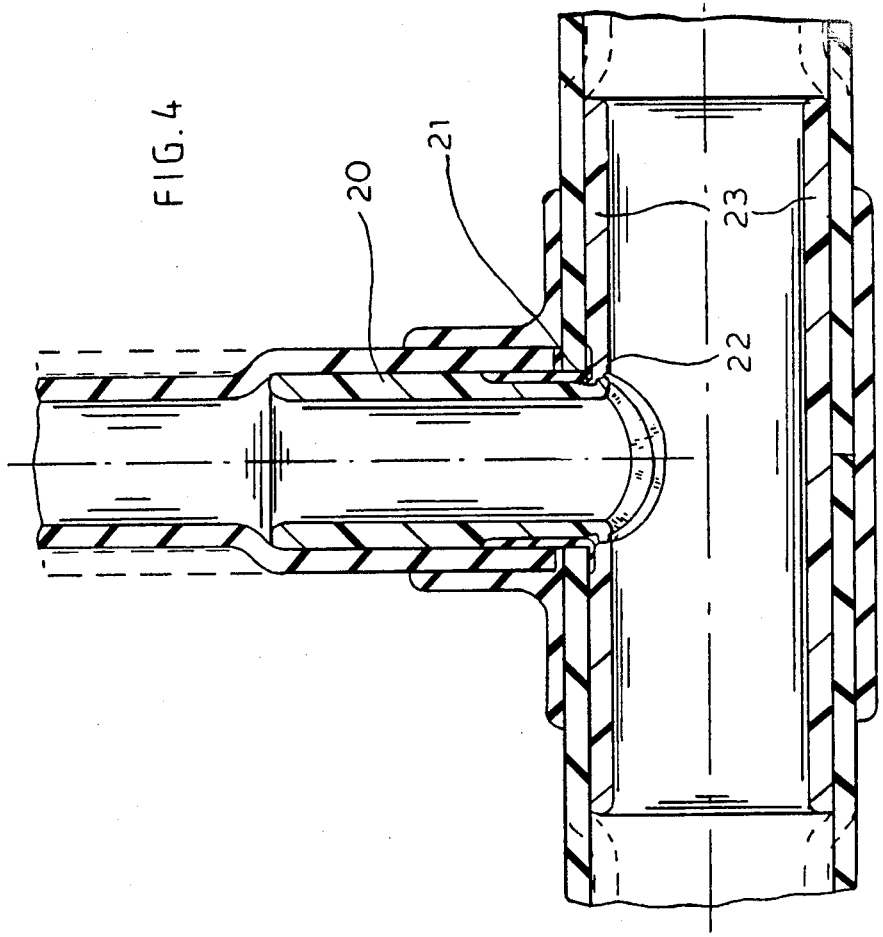

T-SHAPED HOSE

BACKGROUND OF THE INVENTION

The invention relates to a T-shaped hose made of rubber or a rubber-like material with an embedded reinforcing inlay consisting of fabric or similar fiber structures with high loadability. More particularly, it relates to an improved T-shaped hose having a vulcanized hose branch secured with one end on an opening in the wall of a vulcanized main hose. The zone of connection is lined on the inner side of the hose branch with a sleeve made of polyamide or other viscously elastic plastic materials, and the sleeve rests on the cylindrical inner wall of the main hose with a flange-like edge.

T-shaped hoses made of rubber or rubber-like materials are increasingly needed in many technical fields, particularly in the auto industry, where such T-shaped hoses must meet high performance requirements. For example, such hoses have to be resistant to aging and heat, as well as to chemicals. Furthermore, embedded reinforcing inlays are expected to provide such hoses with the capability of receiving high pressures, i.e., high loadability.

In the past, various methods have been employed in the manufacture of such T-shaped hoses. According to the oldest manufacturing process, a T-shaped hose-connecting piece made of metal or plastic material is plugged or pushed over already-vulcanized hose sections (cf. German utility model No. 79 03 744; DE-OS No. 26 44 913; DE-OS No. 32 39 623).

In this regard, it is known from DE-OS No. 32 39 623 that instead of using hose clamps for securing or fastening the hoses, the individual hose sections are secured on the free ends of the manifold by vulcanization with an adhesion-imparting compound and a vulcanizable adhesive compound provided therebetween. However, this manufacture or structure of the T-shaped hose has the following drawbacks:

1. The dimensions of the parts used have to be matched with high accuracy, so that the hose sections can be easily pushed over the manifold, yet still assure a permanent bond between the manifold and the hoses.

2. The T-shaped tubular piece is disposed in the interior of the joined hose sections, after they have been pushed over the manifold, and presents a substantial flow resistance, which is undesirable.

3. The T-shaped manifold made of metal or plastic material and the hose made of rubber or a rubber-like material have different coefficients of expansion, so that when high temperature variations occur, stresses develop within the zone of the branching, leading to early wear of the T-shaped hose.

In order to avoid these drawbacks, a manufacturing process has been developed for T-shaped hoses which basically was carried out according to the following two variations A and B:

(A) A non-vulcanized hose branch is placed over a non-vulcanized or already-vulcanized hose with an opening. Subsequently, the T-shaped hose blank is vulcanized (cf. German utility model No. 74 30 853; DE-PS No. 24 43 824; DE-OS No. 25 51 386; DE-OS No. 31 22 212; DE-OS No. 31 51 640).

(B) The two prevulcanized hose parts are combined with each other by vulcanizing with the help of a non-vulcanized crude rubber part or a vulcanizable rubber compound or solution (cf. DE-AS No. 22 30 719; DE-OS No. 29 51 830; DE-PS No. 31 21 081; DE-PS No. 32 24 610).

The T-shaped hoses manufactured in accordance with these two variations do not exhibit the aforementioned drawbacks because the inner or internal branching piece is missing. However, breaks or cracks are more frequent within the zone of connection, a weak point in the T-zone of the hoses. From the great amount of work performed in this field, it appears that the T-shaped hoses manufactured according to variation A or B do not yet satisfy the highest requirements. Furthermore, the manufacturing processes according to A and B are still too costly, particularly in view of the fact that in most cases, the T-shaped hoses have to be manufactured by means of a mandrel in order to achieve a smooth inner wall. This, in turn, becomes a problem in particular if the hose parts extending from the zone of connection are relatively long and curved in complicated ways.

Now, a new method has been disclosed by the European Patent Application No. 88 571, which is carried out with the use of a sleeve, and which results in a T-shaped hose of the aforementioned type or design. With the T-shaped hose produced according to this method, the aforementioned problems are clearly less frequently encountered. However, this new process requires many production steps to produce a finished T-shaped hose from the hose blanks. Furthermore, this method also requires a number of manual working steps, which are frequently susceptible to error or defect sources, so that the reject rate is relatively high in the final quality control.

Accordingly, it is an object of the present invention to provide an improved T-shaped hose which can be more easily and reliably manufactured.

SUMMARY OF THE INVENTION

This and related objects are achieved according to the invention by providing a T-shaped hose which includes a vulcanized main hose having a wall with an opening therein, and a vulcanized branch hose having one end disposed adjacent to the opening in the main hose, so that the hoses are approximately in the form of a "T", with a gap optionally between the hoses. A hollow generally cylindrical branch sleeve having a generally outwardly directed flange at its lower end and an annular recess formed in the outer wall of the sleeve adjacent to the flange, is disposed primarily within the branch hose with the flange engaging the inner wall of the main hose so as to define therebetween an annular channel. A connecting or fixation member composed of a vulcanizable rubber is received with the recess, channel and, optionally, the gap.

Preferably, the T-shaped hose additionally includes an outer sheath composed of a vulcanizable rubber compound covering the main and branch hoses in the area where they are joined.

In a preferred embodiment, the T-shaped hose further includes a hollow cylindrical main sleeve disposed within the main hose, the main sleeve having an opening aligned with the branch hose, and the flange of the branch sleeve lockingly engaging the main sleeve.

Most desirably, the hoses are made of rubber or a rubber-like material and include an embedded reinforcing inlay made of fabrics or similar fiber structures. It is also desirable that the sleeves be made of polyamide or viscously elastic plastic materials.

When selecting the rubber compound which is injected into the recess and channel, it is preferable that rubber compounds be used which have a certain relationship with the hose material and which exhibit a rapid vulcanization, good adhesion and, in the injection step, the lowest possible viscosity, as discussed below. In addition, these rubber compounds are advantageously highly accelerated in order to avoid overvulcanization or excessive vulcanization of the hose parts. For example, it is important that one starts with a compound that matches the rubber of which the already-vulcanized hose member is made of, e.g., if the hose parts are made of polychlorobutadiene, then the injected rubber compound would also be polychlorobutadiene. Following the state of the art, one would, preferably, start from ethylene-propylene terpolymer (commonly known as "EPDM"). EPDM is particularly preferred because it is relatively inexpensive and has a high resistance to external factors of all kinds. The high resistivity of EPDM is due to the highly-saturated character of the rubber.

It is particularly desirable that the rubber compound used to seal the gaps have a low viscosity in the unvulcanized state. Increased flowability may, e.g., be attained in the rubber compond selected by the addition of 20%–40% by weight of a softener having a paraffin oil base. The rubber compound should then preferably undergo a rapid vulcanization process, e.g., within 12–18 minutes at 170° C. Accelerators, e.g., dithiocarbamate, thiazole, etc., may be used to achieve this rapid vulcanization. In accordance with standard procedure, the mixture is vulcanized with approximately 1%–2% by weight of sulphur. The mixture further contains 20%–40% by weight of soot and is set to a Short hardness of about 60.

The sleeve may be made of plastic material which also exhibits dimensional stability at the vulcanization temperature. Such a plastic may be manufactured by conventional methods known to the synthetic materials industry, e.g., Polyamide 6/6, chemically defined as a polycondensate product from hexamethylenediamine and adipic acid. Also, the thermal stability may be increased by using fillers.

The axial height of the recess is preferably about ⅓ of the length of the sleeve. In this way, the effect caused by the recess is sufficiently taken into account. The radial depth of the ring-shaped recess is desirably approximately one-half the wall thickness of the sleeve.

It is important with the aforesaid dimensions that the remaining portion of the wall of the sleeve still have a completely sufficient strength to withstand all the stresses that might possibly occur. The annular channel has a depth approximately equal the thickness of the wall of the sleeve. The axial measure of the edge of the flange should be about equal to the double thickness of the wall of the hose.

With such a design, the rubber compound injected into the annular space on the flange and sleeve acts like a fixation of the sleeve on the hose. The rubber compound should have sufficient adhesion on the wall of the hose and on the sleeve, so that after the vulcanization step a solid and rigid bond is formed within the zone of the injected rubber compound. Such a structure can be largely mechanized without any trouble sources occurring. The wall of the sleeve disposed outside of the recess requires no adhesion with the wall of the hose. The injected rubber compound also acts as a safe and reliable connecting bridge within the zone in which the face or front side of the secondary hose comes into contact with the wall of the main hose. As a result the zone of connection is highly resistant to bending stresses.

With such a design or structure of the connecting zone, the inner wall of the hose is only temporarily supported by means of a metal sleeve, which may be divided or undivided depending on how difficult it is to remove the sleeve later. Furthermore, within the zone of connection, the main hose may be comprised of two separate pieces. Another advantage of this design is that the connecting zone of the two hoses may also be covered on the outer side with a layer of vulcanizable rubber compound. This layer id advantageously produced in a mold surrounding the zone of connection. The sheathing or jacketing which it forms thereby, can be produced in one work step simultaneously with the injection of the rubber compound within the proximity of the sleeve.

As previously mentioned, the end of the secondary hose may sit butt-jointed on the opening of the main hose, or it is also possible to flange the bottom end of the secondary hose, so that it rests on the main hose with a larger area of contact. This design may be useful if grades of rubber compound are used which tend to exhibit unreliable adhesive bonds.

In a further preferred embodiment of the invention, the main hose has a sleeve made of polyamide or a similar plastic material which has a recess adapted to complement the end of the flange of the branch sleeve. The advantage therein is that the edge of the flange and the opening in the sleeve in the main hose are thus provided with a locking connection. The mechanical connection possibility is capable of producing an additional safety mechanism for the T-shaped zone of connection. Such a sleeve in the main hose and secondary hose has the advantage that it can be provided with matching inserts which, during the flow action, produce throttling effects in the T-shaped hose. Under the same conditions, it is useful, then, if the inner wall of the sleeve is aligned with the inner wall of the other hose, which requires that the ends of the hose are expanded or widened accordingly.

Other objects and features of the present invention will become apparent from the following detailed description when taken in conjunction with the accompanying drawings which disclose several embodiments.

BRIEF DESCRIPTION OF THE DRAWINGS

In the drawings:

FIG. 4 is a cross-sectional view of still a fourth embodiment of the invention.

DETAILED DESCRIPTION OF THE PREFERRED EMBODIMENTS

Figure 1:
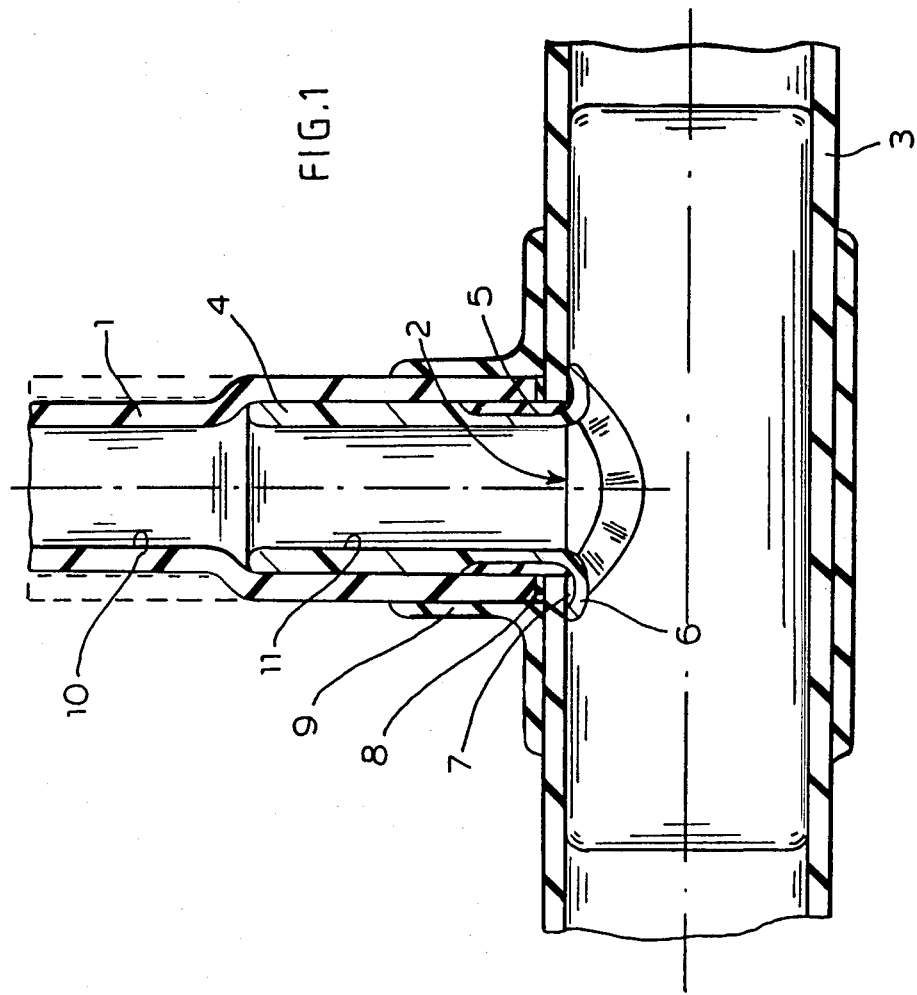
FIG. 1 is a cross-sectional view of a T-shaped hose embodying the present invention.

Referring now in detail to the drawings, and, in particular FIG. 1 thereof, therein illustrated is a novel T-shaped hose which has a secondary or branch hose 1 positioned in a butt-jointed manner adjacent to an opening 2 of a main hose 3. A sleeve 4 made of a polyamide is disposed in the secondary hose 1. Sleeve 4 has a zone on its outer side defining an annular recess 5. Furthermore, sleeve 4 has a flange 6 bent outwardly forming a channel 7. A vulcanizable rubber compound is injected into channel 7 and recess 5. On completion of the vulcanizing step, the injected rubber compound, within zones 5 and 7, secures sleeve 4 against being displaced relative to secondary hose 1 and main hose 3. The rubber compound 9 enclosing the zone of connection is applied in a mold which previously enclosed the hose. Rubber compound 9 also fills intermediate space 8 located inbetween main hose 3 and secondary hose 1. The inner wall 10 of secondary hose 1 and the inner wall 11 of sleeve 4 are aligned with each other in order to keep the flow action as laminar as possible.

Figure 2:
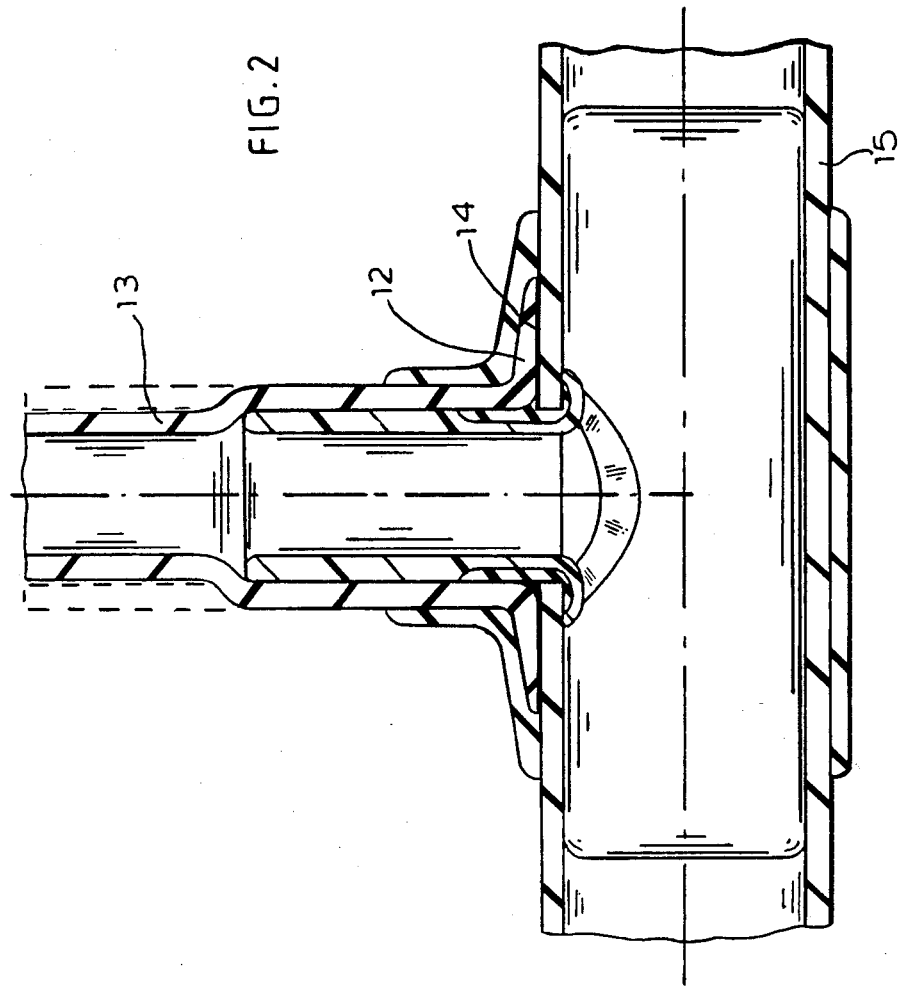
FIG. 2 is a cross-sectional view of a second embodiment of the invention.

According to the embodiment of FIG. 2, the end 12 of the secondary hose 13 is flanged outwardly, so that a larger area of adhesion 14 is produced between the secondary hose 13 and the main hose 15.

Figure 3:
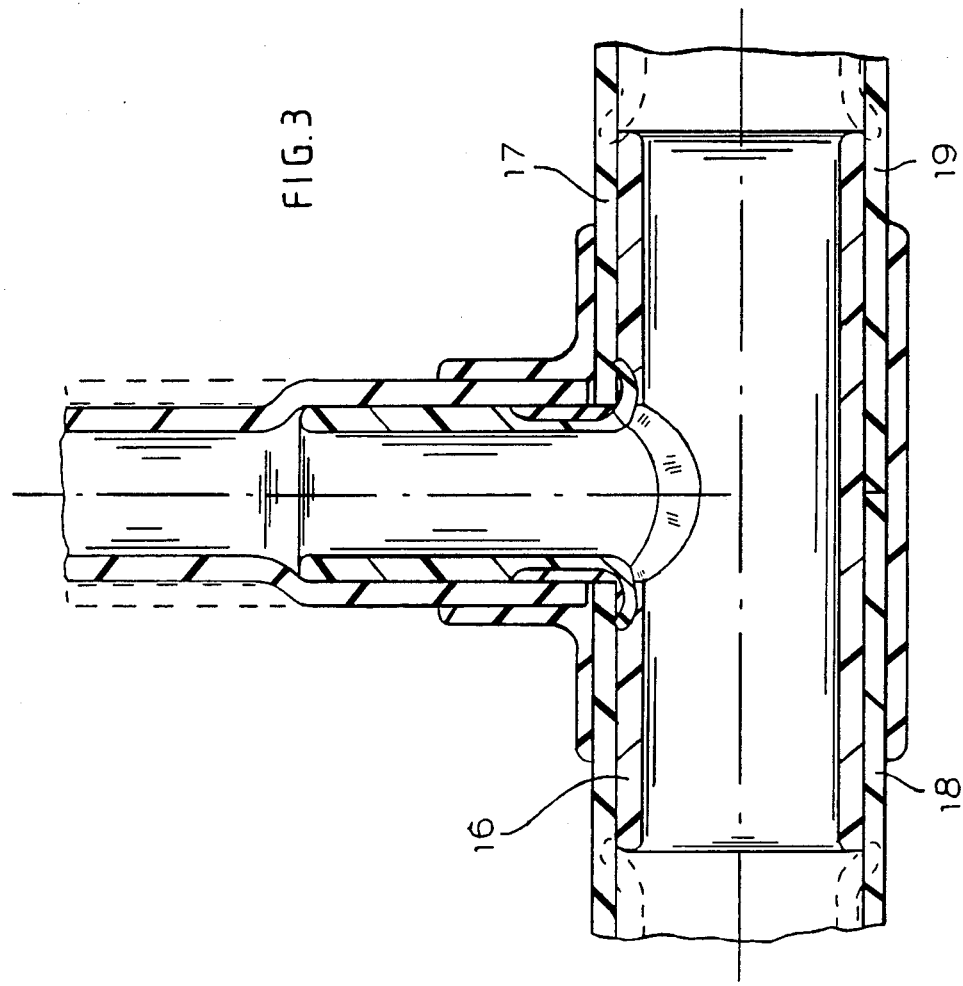
FIG. 3 is a cross-sectional view of yet a third embodiment of the invention.

In the FIG. 3 embodiment, an additional sleeve 16 (as compared to FIG. 1) is inserted in the main hose 17, serving as an auxiliary shaping part. Preferably, main hose 17 is composed within the zone of connection of two hose parts 18 and 19, so that the sleeve can be inserted easily.

Finally, in the embodiment of FIG. 4, the bottom edge of the sleeve 20 has a flange 21 capable of engaging in a matching recess 22 of the sleeve 23.

While only several embodiments of the present invention have been shown and described, it is obvious that many changes and modifications may be made thereunto, without departing from the spirit and scope of the invention.

What is claimed is:

1. In a T-shaped hose formed of rubber or rubber-like material having an embedded reinforcing inlay of high stressability fabric or fiber structure, wherein a vulcanized branch hose is secured at one end at the opening in the wall of a vulcanized main hose, the zone of connection being lined on the inside of the branch hose with a sleeve formed of polyamide or other viscous plastic, which abuts the cylindrical inner wall of the main hose with a flange-like edge, and said zone of connection being covered on the outside with a still-vulcanizable rubber mixture, the improvement comprising:
    an axially wide, annular recess formed in the outer surface of said sleeve adjacent the flange;
    an annular channel formed between the inner wall of the main hose at the connection zone and said flange by said flange being axially deformed backwards at its outer edge, said annular channel being interconnected with said recess; and
    a still-vulcanizable rubber mixture injected into and filling said annular recess and said annular channel so that upon vulcanization a solid and rigid bond is formed between the sleeve and the branch and main hoses at the zone of connection.

2. The T-shaped hose as defined in claim 1, wherein said branch hose is flanged radially outwardly at its end disposed adjacent to said opening in said main hose, thereby forming a large annular area for adhesion between said branch hose and said main hose.

* * * * *